(12) United States Patent
Thornhill

(10) Patent No.: US 8,616,773 B2
(45) Date of Patent: Dec. 31, 2013

(54) HYBRID CROSS AXIS BALL JOINT BUSHING

(75) Inventor: Jay W. Thornhill, Huron, OH (US)

(73) Assignee: The Pullman Company, Milan, OH (US)

( * ) Notice: Subject to any disclaimer, the term of this patent is extended or adjusted under 35 U.S.C. 154(b) by 322 days.

(21) Appl. No.: 13/114,149

(22) Filed: May 24, 2011

(65) Prior Publication Data

US 2012/0099810 A1  Apr. 26, 2012

Related U.S. Application Data

(60) Provisional application No. 61/405,250, filed on Oct. 21, 2010.

(51) Int. Cl.

| F16C 27/00 | (2006.01) |
|---|---|
| F16C 27/06 | (2006.01) |
| B60G 3/18 | (2006.01) |
| B60G 11/22 | (2006.01) |
| F16F 7/00 | (2006.01) |
| F16L 5/00 | (2006.01) |
| F16M 13/00 | (2006.01) |

(52) U.S. Cl.
USPC ............ 384/215; 384/222; 280/124.135; 280/124.177; 267/141; 267/293; 16/2.1; 248/570; 248/583

(58) Field of Classification Search
USPC ............ 384/129, 215, 220, 222; 280/124.135–124.137, 124.169, 280/124.177; 267/140.4, 141, 141.1, 141.2, 267/292, 293; 16/2.1–2.5, 108, 109; 403/122, 123, 132, 133; 248/564, 568, 248/570, 580, 583, 608
See application file for complete search history.

(56) References Cited

U.S. PATENT DOCUMENTS

| 4,327,995 A | 5/1982 | Stewart |
|---|---|---|
| 4,614,455 A * | 9/1986 | Skipper .................. 403/133 |
| 4,671,694 A * | 6/1987 | Brenner et al. ............... 403/226 |
| 5,033,722 A * | 7/1991 | Lammers ..................... 267/153 |
| 5,058,867 A * | 10/1991 | Hadano et al. ............. 267/141.3 |
| 5,902,050 A * | 5/1999 | Balczun et al. ............... 384/206 |
| 6,241,225 B1 * | 6/2001 | Krause ........................ 267/292 |
| 6,899,323 B2 * | 5/2005 | Takeshita et al. ........ 267/140.12 |

FOREIGN PATENT DOCUMENTS

| GB | 2155539 A * | 9/1985 |
|---|---|---|
| JP | 10-153237 | 6/1998 |
| JP | 2007-331496 | 12/2007 |

OTHER PUBLICATIONS

International Search Report and Written Opinion dated Apr. 9, 2012 from corresponding PCT Application No. PCT/US2011/048580.

* cited by examiner

*Primary Examiner* — Marcus Charles
*Assistant Examiner* — Adam D Rogers
(74) *Attorney, Agent, or Firm* — Harness, Dickey & Pierce, P.L.C.

(57) ABSTRACT

An elastomeric bushing includes an inner component, first, second and third elastomeric or plastic members and an outer component. The first elastomeric or plastic member is disposed over the inner component. The second elastomeric or plastic member is disposed over the first elastomeric or plastic member. The third elastomeric or plastic member is disposed over the second elastomeric or plastic member. The outer component is disposed over the third elastomeric or plastic member.

20 Claims, 3 Drawing Sheets

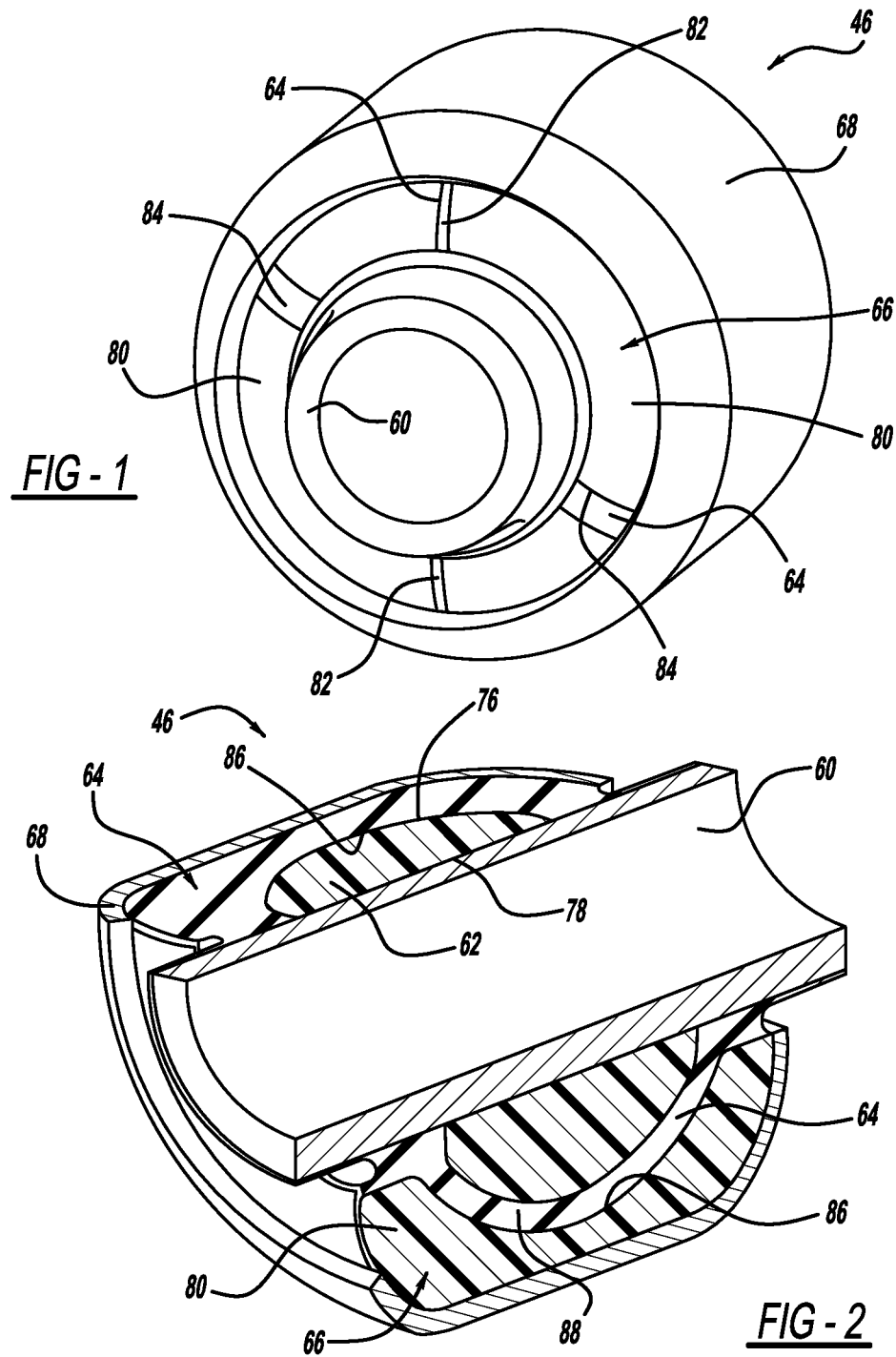

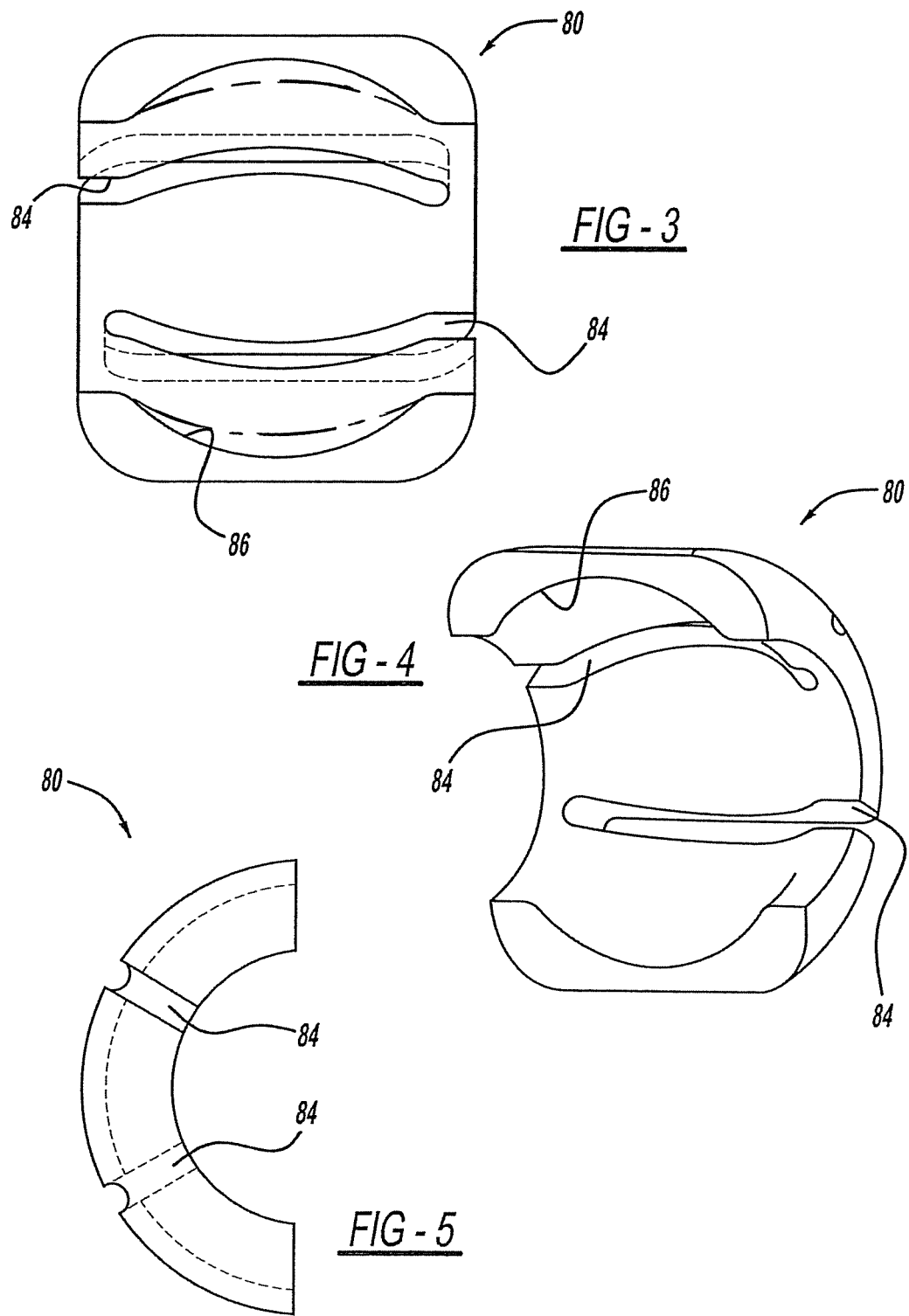

HYBRID CROSS AXIS BALL JOINT BUSHING

CROSS-REFERENCE TO RELATED APPLICATIONS

This application claims the benefit of U.S. Provisional Application No. 61/405,250, filed on Oct. 21, 2010. The entire disclosure of the above application is incorporated herein by reference.

FIELD

The present disclosure relates to an elastomeric bushing which secures a component to a vehicle. More particularly, the present disclosure relates to an elastomeric bushing for attaching a component to a vehicle where the elastomeric bushing increases radial and axial load capacity for a given package space.

BACKGROUND

The statements in this section merely provide background information related to the present disclosure and may not constitute prior art.

Automobile, truck, bus and other applications are commonly designed using an independent front and/or an independent rear suspension system to connect the chassis of the vehicle (the unsprung portion) and the body of the vehicle (the sprung portion). The independent suspension systems normally include an upper control arm, a lower control arm and a hub or knuckle which supports the tire of the vehicle. Each control arm is attached to the frame or other structural component of the vehicle using one or more elastomeric bushings. Each elastomeric bushing usually consists of an outer metal tube which is pressed into the control arm, a layer of elastomer positioned within the outer metal housing and an inner metal housing which extends through the center of the layer of elastomer. The inner metal housing is attached to a bracket on the frame, the supporting structure or the sprung portion of the vehicle or a bolt extends through the inner metal and secures the end of the control arm to the frame, the supporting structure or the sprung portion of the vehicle by mating with an appropriate bracket. As the vehicle travels, relative movement between the sprung and unsprung portions of the vehicle is accommodated by flexing of a coil spring, a torsion bar, an air spring or by another resilient device. The flexing of the resilient device causes the ends of the control arms to pivot on both of the pivot bushings which secure the control arms to the sprung portion of the vehicle.

The elastomeric bushings are used to facilitate this pivotal motion and to isolate the vehicle from shock. The layer of elastomer located between the inner and outer metal housings effectively isolates the sprung portion of the vehicle from the unsprung portion of the vehicle. In certain high load applications, the ends of the outer metal are curved or formed over towards the inner metal in order to further encapsulate the layer of elastomeric material. The curving or forming of the ends and thus the further encapsulating of the layer of elastomeric material improves the radial spring rate, it improves the axial spring rate, it improves the axial retention and it improves the durability of the bushing.

While these elastomer isolated pivot bushings have performed satisfactorily in the field, they are not without their problems. The various problems associated with these prior art pivot bushings include variations in the diameters of the control arms and distortion of the cross section in the area where the pivot bushing is pressed into the control arms. These manufacturing variations in the configuration of the control arms, often allow the bushing to slip out of the control arm when the control arm undergoes an axial load.

Also, in the higher load and the higher travel applications, the rotational angles that the pivot bushing must travel through places a detrimental effect on the life of the elastomeric component of the pivot bushing.

Thus, the continued development of pivot bushings has been directed to the improvements of rotational capabilities, the improvements of performance, the improvements of strength and the improvements of durability while minimizing the manufacturing costs associated with the pivot bushing.

SUMMARY

This section provides a general summary of the disclosure, and is not a comprehensive disclosure of its full scope or all of its features.

The present disclosure provides the art with a hybrid cross axis bushing. The bushing includes an inner metal, a first elastomeric or plastic member that is disposed over the inner metal, a second elastomeric or plastic member that is disposed over the first elastomeric or plastic member and the inner metal, a third elastomeric or plastic member that is disposed over the second elastomeric or plastic member and an outer metal that is disposed over the third elastomeric or plastic member. During assembly of the bushing, the first, second and third elastomeric or plastic members are compressed when assembled into the outer metal.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a perspective view of the elastomeric bushing in accordance with the present disclosure;

FIG. 2 is a perspective view in cross-section of the elastomeric bushing illustrated in FIG. 1;

FIG. 3 is a side view of one of the inner shells illustrated in FIGS. 1 and 2;

FIG. 4 is a perspective view of one of the shells illustrated in FIGS. 1 and 2;

FIG. 5 is an end view of one of the shells illustrated in FIGS. 1 and 2;

DETAILED DESCRIPTION

Example embodiments will now be described more fully with reference to the accompanying drawings.

Figure 6:
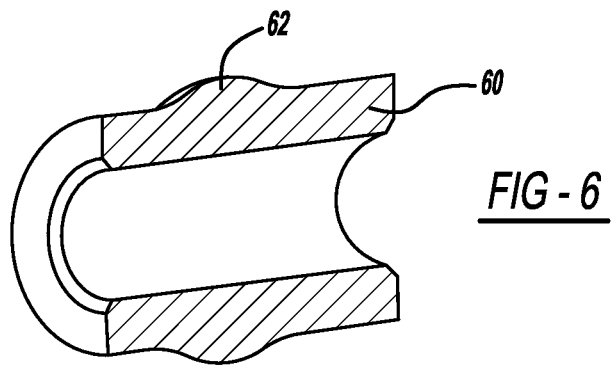
FIG. 6 is a perspective view of an inner component and first member in accordance with another embodiment of the disclosure.
Figure 7:
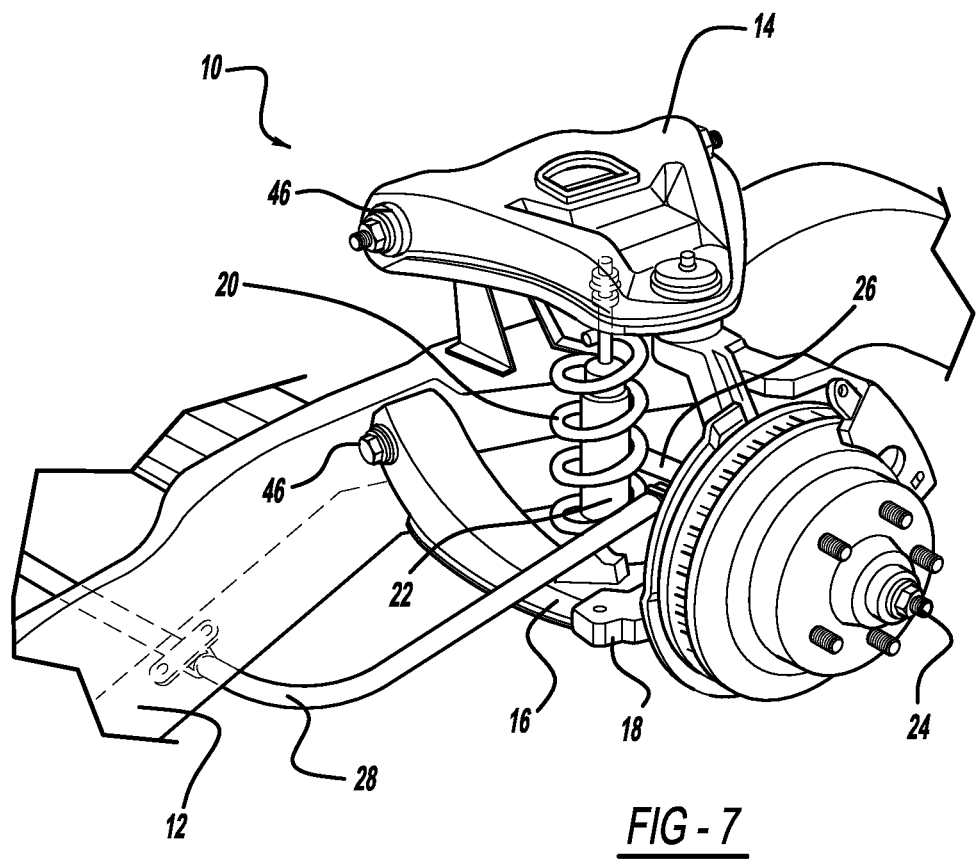
FIG. 7 is a typical suspension for a vehicle which incorporates the elastomeric bushing in accordance with the present disclosure Corresponding reference numerals indicate corresponding parts throughout the several views of the drawings.

Referring now to the drawings in which like reference numerals designate like or corresponding parts throughout the several views, there is illustrated in FIG. 6, an automobile, truck, bus or other suspension system incorporating the elastomeric bushing in accordance with the present disclosure and which is designated generally by reference numeral 10. Suspension system 10 comprises a frame or supporting structure 12 of the vehicle, an upper control arm 14, a lower control arm 16, a hub or knuckle 18, a coil spring 20, a shock absorber 22 and a drive axle assembly 24. Frame or supporting structure 12 supports a body (not shown) and other components of the vehicle which are generally identified as the "sprung mass". Drive axle assembly 24 is attached to a differential or a transaxle (not shown) which receives torque from an engine (not show). Drive axle assembly 24 includes a pair of constant or non-constant velocity joints (not shown). One joint is attached to the differential and one joint is attached to hub or knuckle 18. A drive shaft 26 extends between the two joints. The engine transmits rotation and torque to the differential or transaxle which transfers the rotation and torque from the engine to hub or knuckle 18 through drive axle assembly 24. A wheel (not shown) attached to hub or knuckle 18 is driven by drive axle assembly 34 through hub or knuckle 18. The constant or non-constant velocity joints permit the transmission of torque at various angles which allows suspension system 10 to undergo jounce and rebound motions while still transmitting torque from the differential or transaxle to the wheel of the vehicle.

Coil spring 20 supports the load for the sprung portion of the vehicle and shock absorber 22 dampens the movement of the wheel with respect to frame or supporting structure 12 as is well known in the art. A torque rod or anti-roll bar 28 can be disposed between frame or supporting structure 12 and hub or knuckle 18 to assist in the control of the wheel with respect to frame or supporting structure 12 as is well known in the art.

Referring now to FIGS. 1, 2 and 6, upper control arm 14 and lower control arm 16 are each attached to frame or supporting structure 12 using one or more elastomeric bushing assemblies 46. Each elastomeric bushing assembly 46 is disposed between control arms 14 and 16 and frame or supporting structure 12 to accommodate the motion between these two components and to isolate the sprung portion of the vehicle from shock.

While the present disclosure is being illustrated as having two elastomeric bushing assemblies 46 disposed between upper control arm 14 and 16 and frame or supporting structure 12 and one elastomeric bushing assembly 46 disposed between lower control arm 16 and frame or supporting structure 12, it is within the scope of the present disclosure to utilize elastomeric bushing assembly 46 between any two components that require one of the components to pivot with respect to the other component. In addition, while the present disclosure is being described as having three identical elastomeric bushing assemblies 46 disposed between control arms 14 and 16 and frame or supporting structure 12, it is within the scope of the present disclosure to utilize a different design for each elastomeric bushing assembly 46. Also, while the present disclosure is being illustrated in conjunction with an independent suspension system, it is within the scope of the present disclosure to utilize elastomeric bushing assembly 46 in other suspension designs including, but not limited to, leaf spring suspension systems.

Referring now to FIGS. 1-5, elastomeric bushing assembly 46 comprises an inner component 60, a first member 62, a second elastomeric or plastic member 64, a third elastomeric or plastic member 66 and an outer component 68. Inner component 60 is illustrated as a metal tube. While inner component 60 is illustrated as a metal tube having a generally circular cylindrical shape, it is within the scope of the present disclosure to have different inner components including but not limited to a solid tubular component or any other type of inner component known in the art. Typically, if a solid tubular component is used, a pair of apertures extending through a rectangular end of the solid tubular component are used to secure the bushing assembly to the vehicle.

First member 62 is a metal, elastomeric or plastic member that includes a generally spherical outer surface 76 and a generally cylindrical inner surface 78. First member 62 is assembled over inner component 60 at a position in the middle of inner component 60. First member 62 can slidingly engage inner component 60, it can be press fit over inner component 60 or it can be bonded to inner component 60. While first member 62 is illustrated as having generally spherical outer surface 76, it is within the scope of the present disclosure to have different outer surface shapes for first member 62 including but not limited to cylindrical or any other shape known in the art. Also, while first member 62 is illustrated as being a separate component from inner component 60, it is within the scope of the present disclosure to have inner component 60 and first member 62 a single piece component such as a cold headed metal component as illustrated in FIG. 6.

Second elastomeric or plastic member 64 is disposed over first member 62 and over inner component 60 as illustrated in FIGS. 1 and 2. As illustrated in FIGS. 1 and 2, second elastomeric or plastic member 64 can be designed to cover the entire outer surface of inner component 60 at both sides of first member 62.

Third elastomeric or plastic member 66 comprises a pair of shells 80. As illustrated in the figures, each shell 80 is less than one-half of a circle such that a pair of spaces 82 are disposed at the opposite circumferential ends of each shell 80. Spaces 82 allow for the compression of second elastomeric or plastic member 64 during the assembly of these members into outer component 68. Each shell 80 also includes a plurality of slots 84, two slots are illustrated in the figures, with one slot extending inward from a first end of shell 80 and one slot extending inward from a second opposite end of shell 80. While the figures illustrate two slots 84, it is within the scope of the present disclosure to have any number of slots 84. As illustrated in the figures, second elastomeric or plastic member 64 is disposed within each of the slots 84. Each shell 80 also includes a generally elliptical (as shown in phantom in FIG. 3) or spherical inner surface 86. As illustrated in FIG. 2, when each shell 80 is assembled over first member 62, outer surface 76 and spherical inner surface 86 define a gap 88 which has a constant thickness when inner surface 86 is spherical over the lengths of the spherical surfaces 76 and 86 and which is filled with second elastomeric or plastic member 64. When inner surface 86 is elliptical, gap 88 is designed to be larger at the center of inner surface 86 and smaller at the ends of inner surface 86 adjacent inner component 60. This design will allow for a more even distribution of the torsional stresses.

Outer component 68 is a metal cylindrical tube which is assembled over inner component 60, first member 62, second elastomeric or plastic member 64 and third elastomeric or plastic member 66. Once outer component 68 is assembled over the other components, the ends of outer component 68 are formed or curled over to encapsulate the other components as illustrated in FIGS. 1 and 2. The assembly of outer component 68 compresses second elastomeric or plastic member 64 to provide the necessary preload for elastomeric bushing assembly 46. As illustrated in the figures, outer component 68 is in direct contact with third elastomeric or plastic member 66 and in direct contact with second elastomeric or plastic member 64 at spaces 82 and slots 84.

Elastomeric bushing assembly 46 increases both the radial and axial load capacity for a given package size. The advantage of this design is to allow axial and radial precompression of second elastomeric or plastic member 64 and better balancing of the torsional stresses. The spherical shape of generally spherical outer surface 76 of first member 62 has more area than the typical straight wall or humped designs thus allowing for more stress distribution. Second elastomeric or plastic member 64 is confined both radially and axially by shells 80 of third elastomeric or plastic member 66. This limits travel in both the radial and axial directions which reduces heat generation due to friction. Second elastomeric or plastic member 64 is essentially "swaged" when it is assembly into outer component 68. This assembly operation moves second elastomeric or plastic member 64 from a tension state to a compression state. The amount of compression is dictated by the design of the various components such as the outside diameter of third elastomeric or plastic member 66 and the inside diameter of outer component 68. The amount of compression is directly related to durability.

As a rule of thumb, the more a bushing is "swaged" the higher the durability. With prior art bushings, the swaging is limited by the outer components because too much swaging causes a phosphate fracture of the outer component. Elastomeric bushing assembly 46 includes outer component 68 which is not swaged so the design is not limited by this. The distance that shells 80 must come together during the assembly into outer component 68 determines the compression. This distance can easily be tuned or adjusted to meet rate and durability targets.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An elastomeric bushing comprising:
    an inner component;
    a first member disposed around said inner component;
    a second member disposed around said inner component;
    a third member disposed around said inner component; and
    an outer component disposed around said inner component, around said first member, around said second member and around said third member; wherein
    said second member extends through a longitudinal slot formed in said third member to directly contact said outer component.

2. The elastomeric bushing according to claim 1, wherein said first member includes an inner surface and an outer surface, said inner surface of said first member directly engaging said inner component.

3. The elastomeric bushing according to claim 2, wherein said outer surface of said first member includes a spherical surface.

4. The elastomeric bushing according to claim 2, wherein said second member includes an inner surface and an outer surface, said inner surface of said second member directly engaging said outer surface of said first member.

5. The elastomeric bushing according to claim 4, wherein said inner surface of said second member directly engages said inner component.

6. The elastomeric bushing according to claim 4, wherein an inner surface of said third member includes a spherical surface.

7. The elastomeric bushing according to claim 4, wherein an inner surface of said third member includes an elliptical surface.

8. The elastomeric bushing according to claim 4, wherein said third member includes an inner surface and an outer surface, said inner surface of said third member directly engaging said outer surface of said second member.

9. The elastomeric bushing according to claim 8, wherein said outer surface of said third member directly engages said outer component.

10. The elastomeric bushing according to claim 8, wherein said third member comprises a pair of shells.

11. The elastomeric bushing according to claim 10, wherein said inner surface of said second member directly engages said inner component.

12. The elastomeric bushing according to claim 1, wherein said second member includes an inner surface and an outer surface, said inner surface of said second member directly engaging an outer surface of said first member.

13. The elastomeric bushing according to claim 12, wherein said inner surface of said second member includes a spherical surface.

14. The elastomeric bushing according to claim 12, wherein said third member includes an inner surface and an outer surface, said inner surface of said third member directly engaging said outer surface of said second member.

15. The elastomeric bushing according to claim 14, wherein said outer surface of said third member directly engages said outer component.

16. The elastomeric bushing according to claim 15, wherein said third member comprises a pair of shells.

17. The elastomeric bushing according to claim 1, wherein said third member includes an inner surface and an outer surface, said inner surface of said third member directly engaging an outer surface of said second member.

18. The elastomeric bushing according to claim 17, wherein said outer surface of said third member directly engages said outer component.

19. The elastomeric bushing according to claim 18, wherein said third member comprises a pair of shells.

20. The elastomeric bushing according to claim 1, wherein said inner component and said first member are defined by a single piece component.

* * * * *